United States Patent
Panigrahi

(10) Patent No.: US 9,319,725 B2
(45) Date of Patent: Apr. 19, 2016

(54) SYSTEMS AND METHODS FOR DISTRIBUTED ACCESS TO MEDIA CONTENT USING PLACESHIFTING

(75) Inventor: Biswaranjan Panigrahi, Bangalore (IN)

(73) Assignee: Sling Media PVT Ltd., Bangalore, IN (US)

( * ) Notice: Subject to any disclaimer, the term of this patent is extended or adjusted under 35 U.S.C. 154(b) by 0 days.

(21) Appl. No.: 13/993,598

(22) PCT Filed: Dec. 14, 2010

(86) PCT No.: PCT/IN2010/000805
§ 371 (c)(1),
(2), (4) Date: Jul. 16, 2013

(87) PCT Pub. No.: WO2012/081030
PCT Pub. Date: Jun. 21, 2012

(65) Prior Publication Data
US 2013/0298154 A1 Nov. 7, 2013

(51) Int. Cl.
*H04N 7/173* (2011.01)
*H04N 21/258* (2011.01)
*H04L 29/06* (2006.01)
*H04L 29/08* (2006.01)

(52) U.S. Cl.
CPC ...... *H04N 21/25816* (2013.01); *H04L 65/4084* (2013.01); *H04L 67/18* (2013.01); *H04L 67/2842* (2013.01)

(58) Field of Classification Search
CPC .......... H04N 7/17318; H04N 7/17336; H04N 21/47202
USPC .............................. 725/87–120; 709/219–232
See application file for complete search history.

(56) References Cited

U.S. PATENT DOCUMENTS

| 6,502,125 B1 * | 12/2002 | Kenner et al. ................. 709/203 |
| 6,658,663 B1 * | 12/2003 | Bruynsteen .............. H04N 5/76 348/E7.063 |
| 7,017,174 B1 * | 3/2006 | Sheedy ............. H04N 7/17318 348/E7.071 |

(Continued)

FOREIGN PATENT DOCUMENTS

| JP | 19957154349 | 6/1995 |
| JP | 2005045627 | 2/2005 |
| JP | 2005252325 | 9/2005 |

OTHER PUBLICATIONS

European Patent Office "International Search Report and Written Opinion" mailed Apr. 8, 2011 for International Appln. No. PCT/IN2010/000805.

(Continued)

*Primary Examiner* — Annan Shang
(74) *Attorney, Agent, or Firm* — Ingrassia Fisher & Lorenz, P.C.

(57) ABSTRACT

Systems and techniques are provided to distribute access to stored or other local media content across a number of different placeshifting systems. A server maintains a database of stored programs or other content that is available from at any number of different placeshifting systems. The server processes requests for content received from authenticated users by identifying a placeshifting system that has local content that corresponds to the requested content and that is accessible via a network. The server then facilitates a placeshifting session between the identified placeshifting system and a client device operated by the authenticated user in which the client device obtains the requested content.

20 Claims, 2 Drawing Sheets

(56) References Cited

U.S. PATENT DOCUMENTS

Figure 1:
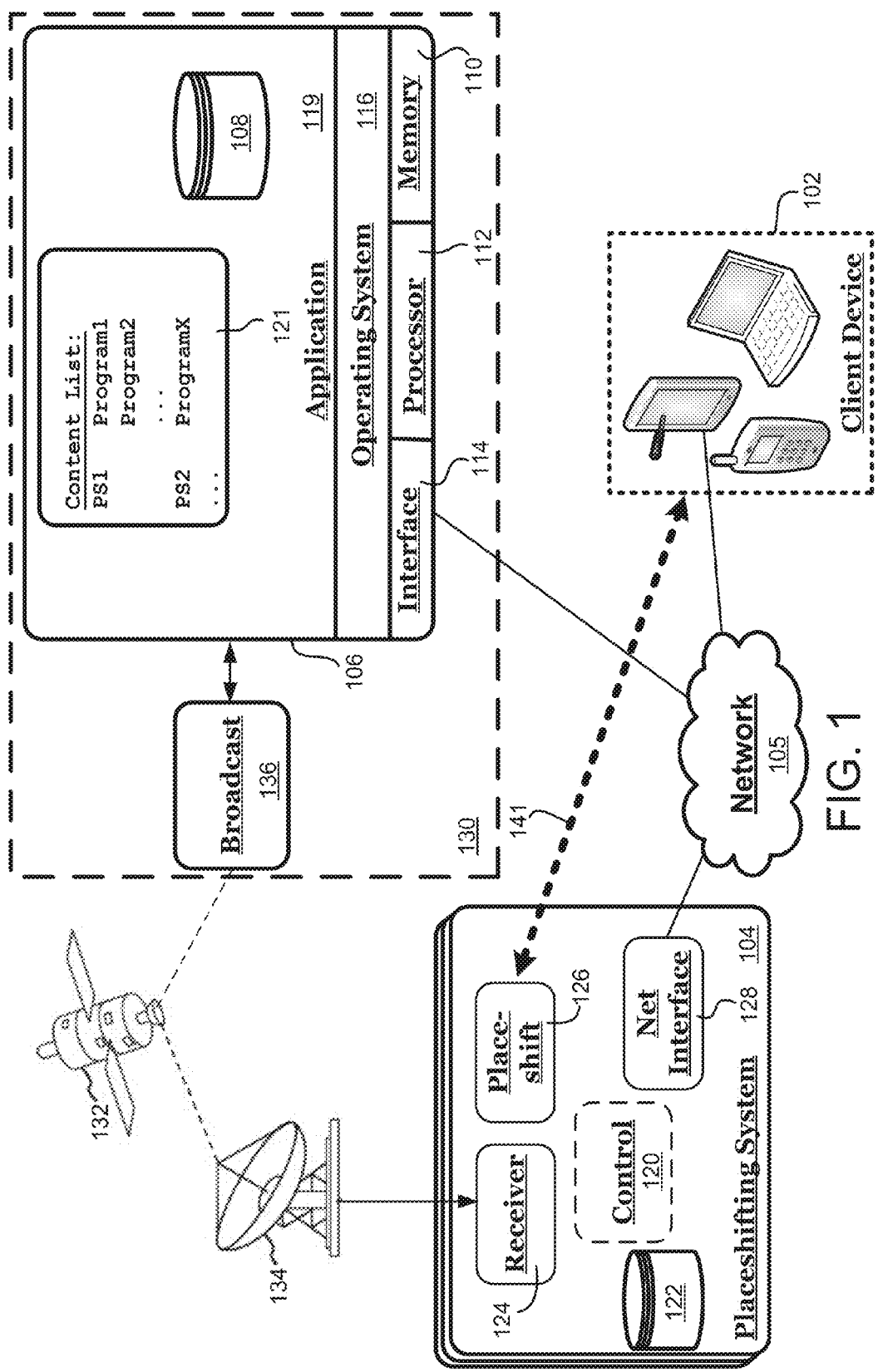

| | | | |
|---|---|---|---|
| 2002/0154892 A1* | 10/2002 | Hoshen | H04N 7/163 386/213 |
| 2002/0162109 A1* | 10/2002 | Shteyn | H04N 7/17336 725/87 |
| 2003/0158958 A1* | 8/2003 | Chiu | H04N 7/173 709/231 |
| 2004/0225728 A1* | 11/2004 | Huggins | H04L 29/06 709/223 |
| 2007/0124779 A1* | 5/2007 | Casey | H04N 7/17318 725/87 |
| 2007/0266169 A1 | 11/2007 | Chen et al. | |
| 2008/0205435 A1* | 8/2008 | Nahumi | H04N 7/17318 370/463 |
| 2009/0037960 A1 | 2/2009 | Melby | |
| 2009/0083813 A1* | 3/2009 | Dolce | H04N 7/16 725/93 |

OTHER PUBLICATIONS

Japan Patent Office, Notice of Rejection Ground, mailed Jul. 29, 2014 for Japanese Patent Application No. 2013-543973.

Satoshi Kamei et al., Evaluation of Traffic Engineering Mechanism for Peer-to-Peer Applications, vol. 109, No. 86 IEICE Technical Report, Japan, The Institute of Electronics, Information and Communication Engineers, Jun. 11, 2006.

Chinese Office Action Issued Jun. 19, 2015 in Application No. 201080071115.X.

Decision of Rejection Issued Jun. 17, 2015 in Korean Patent Application No. 10-2013-7018005.

* cited by examiner

SYSTEMS AND METHODS FOR DISTRIBUTED ACCESS TO MEDIA CONTENT USING PLACESHIFTING

TECHNICAL FIELD

The following discussion generally relates to video content distribution, and more particularly relates to video content distribution using distributed storage and placeshifting.

BACKGROUND

"Placeshifting" refers to shifting the viewing location of television or other media content from one place (e.g., a home television) to another. Many commercially-available placeshifting devices and systems now allow viewers to placeshift content from their home televisions, television receivers, set top boxes (STBs), digital video recorders (DVRs) and/or the like to any other locations where network access can be obtained. Media content can be "placeshifted", for example, by providing a streaming media connection from a placeshifting device to a mobile phone, portable computer and/or other media player that may be located in a different room, building or other remote place that is nevertheless accessible via a local area and/or wide area network. Some modern STBs, media players and other video receivers now incorporate on-board placeshifting functionality for their users. Other users receive placeshifted media content via a dedicated placeshifting appliance, such as the SLINGBOX product available from Sling Media Inc. of Foster City, Calif., USA.

While placeshifting is becoming more commonplace, many viewers do not yet have access to their own personal placeshifting systems. These viewers may nevertheless desire to obtain access to streaming media programs, such as television programs, movies or other content that may be available. Subscribers to a cable or direct broadcast satellite (DBS) service, for example, may wish to obtain streaming media content that may be provided as part of their paid subscriptions. Other viewers may simply wish to gain access to online television, movies on demand and/or other online content in a convenient manner. Current techniques for hosting and distributing media content over a network, however, tend to be expensive and cumbersome to build and maintain.

It is therefore desirable to create systems and methods that allow improved access to streaming media content in a manner that is relatively efficient to implement and use. These and other desirable features and characteristics will become apparent from the subsequent detailed description and the appended claims, taken in conjunction with the accompanying drawings and this background section.

BRIEF SUMMARY

Various embodiments provide systems, devices and/or processes for distributing access to media content across a number of different placeshifting systems. Generally speaking, a network server maintains a database of stored programs or other local media content available from any number of different placeshifting systems. The server processes requests for content received from users by identifying a placeshifting system that has the requested content available, and that is accessible via a network. The server then facilitates a placeshifting session between the identified placeshifting system and a client device operated by the user in which the client device obtains the requested content.

Examples of many different embodiments and implementations are described herein. In some embodiments, a method is executable by a server to allow a user of a client device to obtain requested content via a network. The method suitably comprises receiving, at the server, a list of previously-stored programs or other local content from each of a plurality of placeshifting systems via the network; maintaining, by the server, a database of the local content available at each of the plurality of placeshifting systems; receiving a request for the requested content from a user of a client device at the server via the network; identifying, from the database, one of the placeshifting systems having the requested content available from the local content; and facilitating a connection between the client device and the placeshifting system to thereby allow the client device to obtain the requested content from the placeshifting system via the network.

Other embodiments provide a server system to allow a user of a client device to obtain requested content via a network. The server system suitably comprises an interface to the network and a processor in communication with the interface. The processor is configured to maintain a list of placeshifting systems having local content available via the network and, in response to a request received from a user of a client device via the network, to identify a placeshifting system having the requested content available in the local content, and to facilitate a direct connection between the client device and the placeshifting system over the network in which the client device obtains the requested content from the identified placeshifting system.

Still other embodiments provide a method executable by a set top box having a television receiver, an interface to a data network, and a digital video recorder. The method suitably comprises receiving broadcast television programs from a broadcaster via the television receiver, storing at least some of the broadcast television programs in the digital video recorder, providing a listing of the broadcast television programs stored in the digital video recorder to a server via the data network, receiving, via the data network, a request from a client device for one of the broadcast television programs previously stored in the digital video recorder, and, in response to the request, establishing a placeshifting session with the client device in which the requested broadcast television program is provided to the client device via the data network.

These and other examples, aspects and other features are described in more detail below.

BRIEF DESCRIPTION OF THE DRAWING FIGURES

Figure 2:
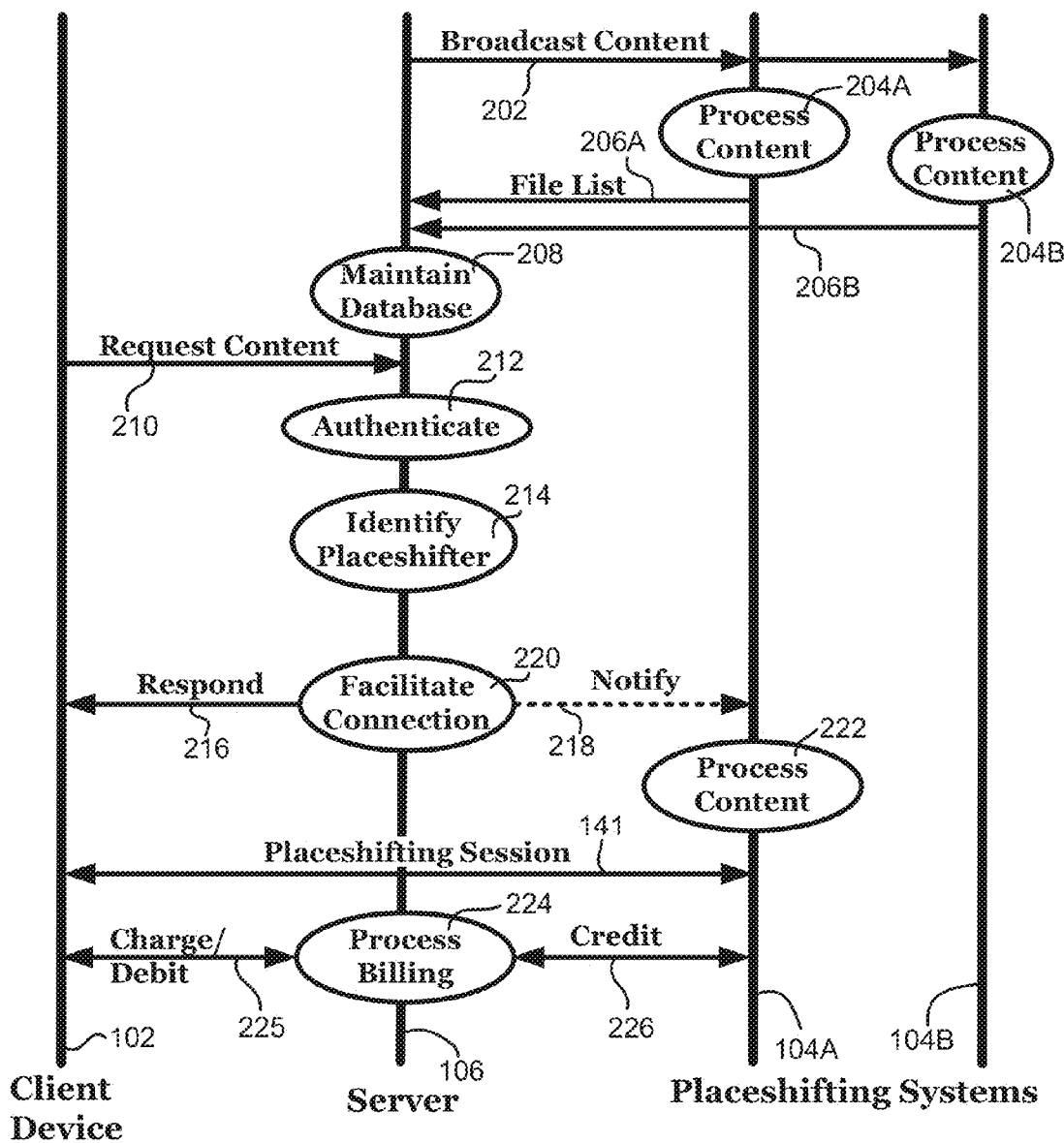

Exemplary embodiments will hereinafter be described in conjunction with the following drawing figures, wherein like numerals denote like elements, and FIG. 1 is a block diagram of an exemplary system that provides access to locally available media content from any number of distributed placeshifting systems; and FIG. 2 is a diagram showing an exemplary process for accessing locally-available media from one or more placeshifting systems.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

Generally speaking, various embodiments provide systems and processes that allow authorized users to obtain and view media content that is obtained from any number of placeshifting systems that are distributed across the Internet or another network. The particular media content that is locally available on each placeshifting system may be selected by the owner or operator of the placeshifting system. Alternatively, some or all of the content may be expressly specified by the content aggregator, and in some embodiments the content is stored on the placeshifting system in advance to ensure a desired distribution of content around the network. In contrast to conventional video hosting systems that provide streaming video directly from a central content server or a conventional content delivery network (CDN), various embodiments allow users to access distributed copies of broadcast programming, previously stored programs and/or other local content that is available at the different placeshifting systems, thereby allowing for dynamic and efficient access to a wide array of content.

In some embodiments, the concepts used herein may be especially useful to subscribers of a satellite, cable or other broadcaster in supplementing or replacing centralized video-on-demand or similar hosting services. By leveraging the capabilities of a diverse and widespread user community, the content aggregator can provide a flexible and efficient placeshifting or streaming service without the administrative overhead of a centralized content server, and without requiring all subscribers to maintain their own placeshifting devices. Content aggregators may charge for the placeshifting services described herein, and/or may provide economic or other incentives to encourage participation by users with excess placeshifting capability. Other embodiments may provide alternate or additional features, as desired, and as described more fully below.

Turning now to the drawing figures and with initial reference to FIG. 1, an exemplary content distribution system 100 suitably includes a server 106 that facilitates placeshifting sessions 141 between placeshifting systems 104 and client devices 102 over network 105. Server 106 maintains a database 121 of local content available to each placeshifting system 104, so that when requests for content are received, server 106 is able to readily identify a placeshifting system 104 that can deliver the requested content in an efficient manner. The content available from any placeshifting system 104 may be determined by the operator of the system, by a broadcaster or other content aggregator 130, or in any other manner. In some embodiments, server 106 dynamically selects the particular placeshifting system 104 to establish the placeshifting session 141 with client device 102 by identifying a system 104 that is geographically close to client device 102, that shares a common internet service provider (ISP) with the client device 102, and/or that is otherwise positioned on network 105 to provide an effective placeshifting session 141.

In various embodiments, system 100 is administered and operated by a cable, DBS or other broadcaster 130 of aggregated programming content. In the example shown in FIG. 1, content broadcaster 130 suitably operates server 106 to facilitate placeshifting connections 141 for distributing media content that may not be otherwise available via network 105. Broadcaster 130 may, for example, initially provide content through a broadcast system 136 that is received and stored at any number of placeshifting systems 104. FIG. 1 shows broadcast system 136 providing content from an uplink center to a satellite 132, which in turn broadcasts the uplinked content to antennas 134 associated with one or more placeshifting systems 104. Equivalent embodiments may use conventional cable television distribution, terrestrial broadcast distribution, separate online distribution, or any other media for initially distributing content for distributed storage at placeshifting systems 104.

Programs broadcast to placeshifting system 104 may be received via receiver 124. In various embodiments, received programs are stored in a DVR or other storage medium 122 for subsequent retrieval and processing. To that end, the local content maintained at any placeshifting device could include broadcast programming, programs stored in a DVR or other storage 122, streaming programming available over network 105, programming available from a media server or player, and/or any other media content accessible to placeshifting system 104.

The local content available to placeshifting systems 104 is made available to server 106, which maintains a database 121 of previously-stored programs available on the various placeshifting systems 104. When a user of a client device 102 requests access to particular content (e.g., a particularly program, broadcast channel, or the like), server 106 is able to consult database 121 to identify a placeshifting system 104 that has local access to the requested content (e.g., via receiver 124 and/or DVR 122), and that can facilitate a placeshifting connection 141 to provide the requested content to client device 102 over network 105. Server 106 may additionally provide an authentication function to ensure that the user is approved to establish placeshifting session 141 and to receive the requested content. If the user is a subscriber to the content broadcaster's service, for example, the server 106 can query a subscriber database 108 to obtain additional information needed to authorize or authenticate the user prior to approving placeshifting session 141. Server 106 may also compensate an owner/operator of placeshifting system 104, as appropriate, for making the distribution service available to others.

Placeshifting systems 104 include any sort of placeshifting hardware, software or other components capable of streaming or otherwise making content received from one or more content sources available to remote client devices 102 that are accessible via network 105. Traditionally, a placeshifting system 104 often provides a stream of content that would ordinarily be presented on a television or other local display to a remote playback device via a local or wide area network 105. In a conventional placeshifting session, placeshifting system 104 suitably receives a source stream from a television receiver, digital video recorder (DVR), media player or the like. The received source audio and video content is appropriately encoded, transcoded and/or otherwise converted to a format that is compatible with network 105, and the converted stream is transmitted over network 105 to a client device 102 that is able to receive, decode and render the received stream to the viewer, as desired. Content may be provided in any conventional format, such as, for example, Windows Media, Quicktime, Flash Media, MPEG, HTML5, Apple HTTP streaming and/or any other formats as desired. Examples of general placeshifting systems and concepts are described in U.S. Pat. No. 7,707,614, although any number of other placeshifting system and techniques could be equivalently applied in other embodiments.

The exemplary embodiment illustrated in FIG. 1 shows placeshifting system 104 implemented within a set top box (STB) or similar integrated system that combines a television receiver 124, a digital video recorder 122 and a placeshifting module 126 into a common chassis or housing with network interface 128 and controller 120 features. Controller 120 may be, for example, a conventional microcontroller, microprocessor, digital signal processor or other programmable device that is capable of executing software or firmware instructions stored in any convenient memory to perform the various functions described herein. One example of a placeshifting STB could include the model VIP922 set top box available from Dish Network Corporation of Englewood, Colo., which uses a system on a chip (SoC) architecture to control program reception and storage, and which includes a separate processor to implement placeshifting functionality. Alternate embodiments may use any different products from any number of manufacturers other than those expressly described herein, including products that implement receiver, storage and/or placeshifting features on a common processor, or that separate media receiving, decoding, storage, local playback and/or placeshifting into any number of separate chips; controllers or other processing modules.

Still other embodiments could equivalently implement placeshifting system 104 using any number of discrete but interconnected components, as desired. For example, a conventional STB or other television receiver 124 that lacked integrated placeshifting features could nevertheless operate in conjunction with a separate placeshifting device 126. Examples of separate placeshifting devices 126 that could be used in various embodiments could include any of the various hardware devices that are commercially available, such as any of the various SLINGBOX products available from Sling Media of Foster City, Calif. or any number of other sources. Other types of placeshifting devices 126 could include general purpose computers, servers or the like executing placeshifting software applications (e.g., the SLINGPROJECTOR application available from Sling Media). The particular commercial products referenced herein are intended solely as illustrative examples; other placeshifting products available from any number of other sources and manufacturers could be equivalently used.

Client device 102 is any device, component, program or the like that is capable of establishing a connection 141 with one or more placeshifting systems 104 via network 105. Client devices 102 may be variously implemented using any sort of portable or desktop computer systems, mobile telephones, tablet devices, media players and/or the like. In some embodiments, client device 102 may be implemented with special-purpose hardware such as the SLINGCATCHER product available from Sling Media, or the like. Client device 102 typically provides interface features to allow the viewer to control one or more placeshifting systems 104 remotely via connection 141. As described more fully below, the placeshifting connection 141 typically allows the viewer to select and obtain content that has been previously stored at one or more placeshifting systems 104, and to manipulate the content stream (e.g., to play, pause, rewind, fast forward, or to take other actions as desired). The client device 102 typically also includes hardware or software logic that is able to decode the received media stream from the placeshifting system 104.

Network 105 may encompass any number of digital or other communications networks that allow multiple nodes to communicate with each other using any common protocols, signaling schemes and/or the like. In various embodiments, network 105 encompasses one or more wired or wireless local area networks (LANs), wide area networks (WANs), and/or the like. Network 105 may also encompass the Internet, any cellular or other telephone network, and/or any other pubic or private networks as desired.

As noted above, server 106 suitably facilitates placeshifting connections 141 between placeshifting systems 104 and client devices 102. Generally speaking, server 106 maintains a list 121 of available placeshifting systems 104 that are available to share locally-available content via network 105. As client devices 102 contact server 106 to request access to particular media content, server 106 appropriately identifies a placeshifting system 104 that has previously stored to the desired content, that is able to receive a live broadcast that contains the desired content, or that is otherwise available to provide the desired content in any manner. The server 106 then facilitates a placeshifting connection 141 between the client device 102 and the identified placeshifting system 104 as appropriate. Server 106 may also provide registration, authentication, access control, billing and/or other features, as described more fully below.

To that end, server 106 is any hardware, software and/or other logic that is accessible via network 105 and that coordinates the sharing of content via one or more placeshifting systems 104. The placeshifting systems 104 may be physically located local or remote to server 106. Server 106 may also maintain (or at least have access to) a subscriber database 108 that contains user information (e.g., accounts, passwords, etc) and/or billing information, as desired. Typically, server 106 executes a software application 119 that maintains database 121, processes requests from client devices 102, and facilitates placeshifting sessions 141, as appropriate.

In the embodiment illustrated in FIG. 1, server 106 is shown using conventional network server hardware, software, firmware and/or other components such as a conventional processor 112, memory 110, input/output interfaces 114, or the like. Server 106 typically executes an operating system 116 (e.g, LINUX, UNIX, WINDOWS and/or the like) that allows applications 119 to interact with hardware 110-114. Operating system 116 typically includes socket or other programming mechanisms that allow application 119 to access network interfaces, mass storage and/or other Various embodiments of server 106 may be implemented using dedicated or shared hardware servers; other implementations may make use of virtual server features as part of a "cloud computing" service, such as any of the cloud computing services provided by AMAZON, GOOGLE, MICROSOFT, IBM, UBUNTU, SUN MICROSYSTEMS, SALESFORCE.COM and/or any number of other providers. The Amazon Web Services (AWS) products and services available from Amazon.com, for example, could be used to implement some or all of server 106 in some embodiments, although other embodiments may use any other products or services as desired. In some implementation, multiple servers 106 may be provided (along with appropriate server assignment, messaging, security and/or load balancing features) to provide additional processing capability as needed.

In operation, then, server 106 receives and maintains a database or other list 121 of content that is locally available at each placeshifting system 104. Such content may include programs that have been previously-recorded, channels that are receivable via any receiver 124, and/or the like. To obtain access to desired content via network 105, a viewer suitably operates a client device 102 to connect with server 106. Server 106 suitably identifies an available placeshifting system 104 on list 121 that has access to the particular content desired by the viewer, and facilitates a placeshifting connection 141 between the client device 102 and the identified placeshifting system 104 as appropriate.

FIG. 2 shows an exemplary process 200 to establish a placeshifting session 141 from one or more placeshifting systems 104 to a client 102. This process 200 shows communications and processing handled by client 102, server 106 and one or more placeshifting systems 104. Each of the processing functions may be implemented in hardware, software and/or firmware logic, as appropriate. The various functions associated with server 106, for example, may be carried out in response to software instructions that are stored in memory 110 or another non-transitory storage, and that are executed by processor 112 or the like. Similarly, the various processes and functions associated with placeshifting system 104 may be carried out by controller 120, or by any other control logic in a placeshifting device 126 or other component as desired.

As shown in FIG. 2, broadcast content 202 is received at one or more placeshifting systems 104A-B as appropriate (functions 204A-B, respectively). Such content may be transmitted via broadcaster 130, for example, and received at receiver 124. In many embodiments, some of the programs broadcast can be stored in a DVR or similar storage for subsequent retrieval by the operator of the placeshifting system 104, or for placeshifting to a client device 102 via network 105.

The particular content that is stored at any placeshifting system 104 may be determined in any manner. In some embodiments, the operator of the placeshifting system 104 simply selects programs for his or her own enjoyment, and records these programs on DVR 122 as desired. Content broadcaster 130 may additionally or alternately determine that particular programs should be stored on particular placeshifting systems 104 as appropriate. Broadcaster 130 may also direct that copies of stored programs are properly distributed to multiple placeshifting systems 104 around network 105, to ensure that an adequate number of copies are available for placeshifting. Broadcaster 130 may send instructions to receiver 124 or another component of placeshifting system 104 via broadcast system 136, network 105, via a telephone link, and/or using any other communications links or channels that may be available. A DBS or cable operator, for example, could embed codes in a non-content bearing channel that instructs particular systems 104 to take certain actions, such as recording certain programs, deleting certain programs from storage 122, updating software or firmware, or taking other actions as appropriate. In some embodiments, the owner/operator of the placeshifting system 104 suitably grants the broadcaster 130 permission to store certain programs, to use a certain percentage of the capacity of DVR 122, or to perform other tasks as needed.

Server 106 maintains a database 121 of local content available from each placeshifting system 104 (function 208). In the exemplary embodiment shown in FIG. 2, this database 121 is updated with information from each placeshifting system 104A-B that participates in system 100. In this example, each placeshifting system 104A-B provides a list of local content that is available for placeshifting to server 106 (function 206A-B). As noted above, local content that is available for placeshifting may reflect some or all of the programs stored in local storage 122, some or all of the broadcast channels receivable by the particular placeshifting system 104, and/or any other content that is available for placeshifting to others.

Note that not all of the content available at placeshifting system 104 needs to be made available to others. Various embodiments could allow an owner or operator of the system 104 to enable or restrict placeshifting of certain programs in storage 122 or certain channels received via receiver 124, for example. Similarly, broadcaster 130 may restrict storage and/or placeshifting of certain broadcast programs, channels or other content. These restrictions may be time based (e.g., no placeshifting of certain programs or channels until similar programs have been broadcast in other timezones), content based (e.g., enforcing content licensor restrictions), geographic based (e.g., no placeshifting of certain content to different countries, enforcing regional blackouts imposed by content licensors or governmental entities), and/or the like.

The local content available to placeshifting systems 104A-B may be provided to server 106 (functions 206A-B) on any basis. In some embodiments, system 104 provides the list on regular intervals, or upon the occurrence of certain events (e.g., power up, updates to the local content list, or the like). In other embodiments, server 106 polls each placeshifting system 104A-B on an appropriate temporal basis to ensure that database 121 remains accurate and current.

Server 106 maintains the database 121 of pre-recorded content as appropriate (function 208). In various embodiments, server 106 updates the database 121 as updates are received from systems 104A-B. Server 106 may also prompt systems 104A-B or otherwise receive updates from systems 104A-B on any regular or other basis to ensure that systems 104A-B are currently online, and that the information listed in database 121 is still available. In some cases, server 106 may not need regular updates. If a placeshifting system 104 simply provides access to broadcast channels, for example, the server 106 may not need updates as to the content or channels that are available if the server 106 is already aware of the system's 104 location, television service provider (e.g., broadcaster 130), subscription level, and/or the like. Much of this information may be obtained and/or updated from subscriber database 108 and/or another appropriate source, as desired.

Server 106 processes requests (function 210) for content that are received via network 105 from users as appropriate. In various embodiments, request 210 represents several iterations of communication with client device 102 as the user establishes an account with server 106, provides authentication credentials, obtains menus or lists of available options, and/or selects desired actions. Interactions between server 106 and client device 102 may be performed, for example, using the hypertext transport protocol (HTTP) or the like to facilitate convenient exchange of information in any manner.

Users may be authenticated in any manner (function 212). In various embodiments, users are authenticated by checking a userid/password combination against information previously stored in subscriber database 108 or elsewhere. Other embodiments may use digital signatures or other cryptographic tools, biometric information, or any other digital credentials to verify that the user is authorized to use the system. Various embodiments may further verify that the user is authorized to obtain the particular content requested. If a user has paid for access to a certain program or network, for example, then access can be granted to allow access to programs that meet those criteria while denying access to other programs.

If the user is authenticated and authorized to obtain network access to the requested content, then server 106 suitably identifies an appropriate placeshifting system 104 to establish session 141 over network 105. The appropriate system 104 may be identified by, for example, checking database 121 to identify placeshifting systems 104 that have previously-stored the requested content. The identification process may be refined even further in some embodiments by identifying particular placeshifting systems 104 that may be most convenient to the client device 102. Convenient systems 104 may be located on the same continent, country, city, state or other geographic region as client system 102, for example. Geographic locations may be determined from user prompts, from pre-stored information (e.g., in subscriber database 108), from internet protocol (IP) or similar addresses, or in any other manner. Server 106 may alternately select a system 104 that is relatively close in terms of network architecture or other logical layout. If a client and server operate within the same network domain, or have the same internet service provider (ISP), for example, they will typically communicate more effectively than clients and server located on separate networks.

Placeshifting connection 141 is established between client device 102 and the identified placeshifting system 104 in any manner (function 220). In various embodiments, server 106 facilitates the establishment of connection 141 by providing addresses, security tokens, and/or other information as needed to either of both of client device 102 and/or placeshifting system 104. In various embodiments, an address of the identified placeshifting system (e.g., system 104A in the example illustrated in FIG. 2) is provided to client device 102 so that client device 102 is able to contact the identified placeshifting system 104A to set up connection 141 directly. Some embodiments may further notify the identified placeshifting system 104A that a connection to client device 102 has been approved. If a direct connection to the identified placeshifting connection 104A is difficult to establish due to firewalls or other features of network 105, any number of intermediating techniques could be used. Several examples of techniques for establishing connections to placeshifting systems 104 that are located behind firewalls are described in United States Patent Publication No. 2010/0268832, and various systems and techniques for establishing a secure placeshifting connection are described in United States Patent Publication No. 2010/0005483, the contents of both of which are incorporated by reference in their entirety and for the purpose of teaching techniques for establishing connections to devices located behind firewalls. Further, other connection systems and techniques could be used separately or in conjunction with those described in these publications.

In some implementations, server 106 is able to securely share access to placeshifting systems 104 while maintaining viewer anonymity. Server 106 can authenticate a user, for example, and then send an approval message to the placeshift system 104 that authorizes the sharing connection 141. The placeshifting system 104 is then able to accept the secure connection based upon trust in server 106, even if the system 104 does not have any additional information about client device 102 or the viewer. Server 106 may authorize a connection 141 to a particular network address (e.g., an IP address) associated with client device 102, for example, without providing additional information. To provide even more anonymity, server 106 could alternately provide (or at least reference) a proxy address and/or an intermediary service on network 105 that is accessible to both client device 102 and placeshifting systems 104. Server 106 could relay a proxy address for client device 102 to a shared system 104, for example, to preserve the anonymity of the client device 102 and viewer while still allowing communications via the proxy. An intermediating service (which could be implemented as part of server 106, or as a separate service) could similarly accept connections from both client device 102 and shared system 104 and relay data between the two devices without identifying either device to the other. Any number of equivalent embodiments may implement connectivity, security, privacy and/or anonymity features in any other manner.

Connection 141 typically includes a control channel and a content stream, as appropriate. After connection 141 is established between the client device 102 and the identified placeshifting system 104A, client device 102 appropriately controls the placeshifting system 104A using the control channel to select and adjust the content stream as desired. Placeshifting system 104 suitably obtains the requested content from receiver 124, storage 122 and/or any other media source as appropriate. The selected source provides the desired media content (e.g., from a television channel received via receiver 124, a program stored on storage 122, and/or the like) to placeshifting device 126 for any suitable encoding, transcoding, compression or other processing. The content may be adjusted (e.g., fast forward/rewind, play/pause, channel up/down) as needed in response to user inputs received from client device 102.

Note that while the placeshifting system 104A is under control by the client device 102, it may be unavailable for use by the owner or operator of the system 104A itself, depending upon the capabilities of the system 104. In various embodiments, the operator of placeshifting system 104 may be compensated for the time that the system 104 is unavailable. In other embodiments, the operator may be able to access other content from another placeshifting system 104 via system 100 or to obtain other special programming from broadcaster 130, as appropriate. In still other embodiments, placeshifting system operators may agree to make their systems 104 available for use by others only at certain times (e.g., late at night, while the operator is not home, and/or the like) so that the operator retains the right to uninterrupted use of his or her system 104 during desired time periods. Other embodiments may address any restrictions on the operator's use or non-use of system 104 while it is placeshifting to another user in any other manner.

The placeshifting session 141 between placeshifting system 104A and client device 102 may continue for any appropriate duration. If the viewer is finished viewing content from the identified placeshifting system 104A, client device 102 may initiate a disconnection in response to viewer inputs. Server 106 may additionally disconnect the connection 141 if the viewer's approved time has expired, or for any other reason. To that end, various embodiments may allow the shared placeshifting system 104A, the client device 102 and/or the server 106 to disconnect placeshifting session 141 at any time.

Various embodiments of server 106 are further able to process billing functions (function 224) in any manner. As noted above in connection, billing or payment accounts may be maintained (e.g., in database 108 or elsewhere in connection with server 106) for viewers and/or operators of placeshifting systems 104. In various embodiments, viewers may be charged 226 for shared access to placeshifting systems 104 as desired. Charges 226 may be levied on a temporal basis (e.g., a per-minute charge for the duration of connection 141), on a per-connection basis (e.g., a flat rate for each connection 141 established), on a daily/weekly/monthly/annual or other temporal basis (e.g., a flat amount per time period covers all usage during that time period), and/or in any other way. Various embodiments may additionally or alternately charge for access to particular programs, channels or other resources (e.g., a fee for viewing a movie channel or premium network) as desired. Charges may also be imposed for higher quality content (e.g., higher resolution video, or content that is more valuable for any reason). The example of FIG. 2 shows charges being levied in arrears, after the connection 141 is disconnected; equivalent embodiments, however, may process billing 224 prior to establishing the connection and/or concurrently while the connection persists. Payment may be processed using conventional credit or debit card processing, automated clearing house (ACH), and/or any other conventional techniques. In various embodiments, each viewer prepays for "credits" that are tracked in an account in database 108 that is associated with the viewer. Credits are exchanged for connections, connection time, premium content, and/or other benefits. Other embodiments may process billing 224 in any other manner desired.

Further embodiments may additionally or alternately provide billing credit 228 to placeshifting device operators as compensation for sharing access to their systems 104. Credits may be awarded and tracked within database 108, as desired. Credits may be exchanged for anything of value, including cash, credit on a television billing statement, access to other shared placeshifting systems 104, and/or the like. In various embodiments, operators are encouraged to share access to their placeshifting systems 104 by providing billing credits 228 in an account maintained by server 106 that can be redeemed in exchanged for placeshifting sessions with other placeshifting systems 104 (e.g., systems 104 that are located in other locales or that have stored content that would be otherwise unavailable to the operator). Content owners or providers may also be compensated by server 106 or, the like to as payment for DRM or other fees. Another approach could require that any users of the system 100 provide access to their own placeshifting systems 104 during certain times. Other credit/reward systems and techniques may be implemented as well.

Although the exemplary embodiment shown in FIG. 2 shows placeshifting session 141 as being established directly between client device 102 and placeshifting system 104, equivalent embodiments could use server 106 (or another server available on network 105) as an intermediary. In such embodiments, the client device 102 and placeshifting systems 104 may not know the particular identities, locations or addresses of each other. Instead, client 102 and system 104 simply operate with an inter-mediating server (e.g., server 106), which suitably relays command instructions from client device 102 to system 104 while forwarding the media stream from the placeshifting system 104 to the client device 102. Other embodiments may supplement the various systems, functions and messages shown in FIG. 2 by providing inter-mediating gateways, servers or other functionality, or in any other manner as desired.

Accordingly, new systems and techniques are presented for allowing an authorized user of a computer, mobile phone, tablet or other device to securely access placeshifted content that is distributed across network 105. By spreading content across the network 105, system 100 suitably allows any number of users to obtain access to a wide array of content via network 105 in a convenient, efficient and flexible manner.

As used herein, the word "exemplary" means "serving as an example, instance, or illustration." Any implementation described herein as exemplary is not necessarily to be construed as preferred or advantageous over other implementations.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

What is claimed is:

1. A method executable by a server to allow users of client devices to obtain requested content via a network, the method comprising:
   receiving, at the server, a list of local content available from each of a plurality of placeshifting systems via the network, wherein each of the plurality of placeshifting systems is a user-operated placeshifting device associated with one of the users that receives the local content from broadcast programming that is locally available to that user-operated placeshifting device and that encodes the received local content from a broadcast format to a streaming format that is transmittable on the network;
   maintaining, by the server, a database of the local content available at each of the plurality of user-operated placeshifting devices;
   receiving a request for the requested content from a user of a client device at the server via the network, wherein the requested content corresponds to broadcasting content that is locally available in some locations but not in others;
   identifying, from the database, one of the user-operated placeshifting devices having access to the locally-available broadcast content that corresponds to the requested content; and
   facilitating a connection between the client device and the identified user-operated placeshifting device to thereby allow the client device to obtain the requested content in the streaming format directly from the identified user-operated placeshifting device via the network.

2. The method of claim 1 wherein the local content comprises previously-stored television programs stored on user-operated digital video recorders each associated with one of the user-operated placeshifting devices.

3. The method of claim 2 wherein the previously-stored television programs stored at each of the plurality of user-operated placeshifting devices are received from a content broadcaster affiliated with the server.

4. The method of claim 3 wherein the previously-stored television programs are stored on the plurality of user-operated placeshifting device under the direction of the content broadcaster.

5. The method of claim 4 further comprising authenticating the user by the server, and wherein the facilitating is performed only if the user is authenticated as a customer of the content broadcaster.

6. The method of claim 1 wherein the identifying further comprises identifying one of the plurality of user-operated placeshifting devices storing the requested content that is located in geographic proximity to the client device.

7. The method of claim 1 wherein the identifying further comprises identifying one of the placeshifting systems storing the requested content that has a common internet service provider (ISP) as the client device.

8. The method of claim 1 wherein the local content is broadcast to the plurality of placeshifting systems via a direct broadcast satellite television link that is separate from the network.

9. The method of claim 1 wherein the local content is broadcast to the plurality of placeshifting systems via a cable television link that is separate from the network.

10. A server system to allow a user of a client device to obtain requested content stored on a plurality of user-operated placeshifting devices via a network, wherein each of the plurality of user-operated placeshifting devices receives local content from locally-available broadcast programming and encodes the received local content from a broadcast format to a streaming format that is transmittable on the network, the system comprising:
    an interface to the network; and
    a processor in communication with the interface, wherein the processor is configured to maintain a list of the local content that is available on each of the plurality of user-operated placeshifting systems and, in response to a request for requested content received from the user of the client device via the network, to identify one of the plurality of user-operated placeshifting systems operated by another user that has received the locally-available broadcast programming that corresponds to the requested content, and to facilitate a placeshifting connection between the client device and the identified user-operated placeshifting system over the network in which the client device obtains the locally-available broadcast programming received by the identified user-operated placeshifting device in the streaming format directly from the identified placeshifting system.

11. The server system of claim 10, wherein the processor is configured to dynamically facilitate the placeshifting connection with one of the plurality of user-operated placeshifting systems that has the requested content and that is located in geographic proximity to the client device.

12. The server system of claim 10, wherein the processor is configured to dynamically facilitate the placeshifting connection with one of the plurality of user-operated placeshifting systems that has the requested content and that is located in logical proximity to the client device on the network.

13. The server system of claim 10, wherein the local content comprises previously-stored content broadcast to the plurality of placeshifting systems from a content broadcaster via a broadcast television medium that is separate from the network.

14. The server system of claim 13 wherein at least some of the previously-stored programs are determined by the content broadcaster.

15. The server system of claim 13 wherein the placeshifting system is a user operated set top box that comprises:
a television receiver configured to receive broadcast television programming from the broadcast medium;
a digital video recorder configured to store at least some of the received television programming as the previously-stored content; and
a placeshifting module configured to transmit the requested content to the client device via the network.

16. The server system of claim 15 wherein the set top box is managed by a first subscriber of the content broadcaster, and wherein the user is a second subscriber of the content broadcaster.

17. A method executable by a user operated set top box that comprises a television receiver, an interface to a data network, and a digital video recorder, the method comprising:
receiving broadcast television programs from a television broadcaster via the television receiver of the user operated set top box;
storing at least some of the broadcast television programs in the digital video recorder of the user operated set top box;
providing a listing of the broadcast television programs stored in the digital video recorder from the user operated set top box to a server via the data network;
receiving, via the data network, a request from a client device operated by a different user for one of the broadcast television programs previously stored by the user in the digital video recorder, wherein the different user is different from the user of the of the user operated set top box; and
in response to the request, the user operated set top box encoding the requested broadcast television program into a streaming format that is transmittable on the network and establishing a placeshifting session with the client device in which the requested broadcast television program in the streaming format is directly provided from the user operated set top box to the client device as a video stream via the data network.

18. The method of claim 17 wherein at least some of the programs stored on the digital video recorder of the user operated set top box are stored at the direction of the broadcaster.

19. The method of claim 17 further comprising the user operated set top box receiving a credential from the server, and wherein the establishing is contingent upon receipt of the credential.

20. The method of claim 17 wherein the television receiver is a direct broadcast satellite receiver, wherein the user operated set top box is managed by a first subscriber of the broadcaster, and wherein the different user of the client device is a second subscriber of the broadcaster.

* * * * *